(12) United States Patent
Wiedemeier et al.

(10) Patent No.: US 10,648,583 B1
(45) Date of Patent: May 12, 2020

(54) PRESSURE-COMPENSATED RUPTURE DISK ASSEMBLY FOR SUBSEA PROTECTION OF A PRESSURE VESSEL

(71) Applicant: THE UNITED STATES OF AMERICA AS REPRESENTED BY THE SECRETARY OF THE NAVY, San Diego, CA (US)

(72) Inventors: Brandon J. Wiedemeier, San Diego, CA (US); Tyler J. Harrison, San Diego, CA (US); Gregory W. Anderson, San Diego, CA (US); Carl E. Lostrom, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 102 days.

(21) Appl. No.: 16/047,067

(22) Filed: Jul. 27, 2018

(51) Int. Cl.
*F16K 17/16* (2006.01)

(52) U.S. Cl.
CPC .................. *F16K 17/162* (2013.01)

(58) Field of Classification Search
CPC .............................. F16K 17/16; F16K 17/162
See application file for complete search history.

(56) References Cited

U.S. PATENT DOCUMENTS

| | | | | |
|---|---|---|---|---|
| 3,608,569 A | * | 9/1971 | Burns | F16K 17/16 137/69 |
| 4,049,367 A | * | 9/1977 | Tominaga | B01J 3/08 425/77 |
| 4,390,043 A | * | 6/1983 | Ward | F16L 55/1283 138/89 |
| 4,424,738 A | * | 1/1984 | Leighton | F16K 17/044 137/116.5 |
| 4,444,214 A | * | 4/1984 | Paul, Jr. | F16K 17/16 137/68.28 |
| 4,619,285 A | * | 10/1986 | Piet | B63C 9/24 137/484.6 |
| 4,840,195 A | * | 6/1989 | Zabrenski | G05D 16/0669 137/312 |
| 4,951,697 A | * | 8/1990 | Fritts | F16K 17/1606 116/266 |
| 5,291,912 A | * | 3/1994 | Comeaux | F16K 3/02 137/14 |
| 5,511,617 A | * | 4/1996 | Snider | E21B 34/063 166/185 |
| 5,609,359 A | * | 3/1997 | Johnson | B60R 21/26 137/543.15 |
| 5,677,478 A | * | 10/1997 | Murphy, Jr. | F16K 17/162 137/68.23 |
| 5,947,143 A | * | 9/1999 | Moakes | F16K 13/06 137/68.13 |
| 6,321,846 B1 | | 11/2001 | Rytlewski | |

(Continued)

*Primary Examiner* — Seth W. Mackay-Smith
(74) *Attorney, Agent, or Firm* — Naval Information Warfare Center, Pacific; Kyle Eppele; James Eric Anderon

(57) ABSTRACT

A pressure-compensated rupture disk assembly and method for subsea protection of a pressure vessel. The assembly and method incorporate a piston device, a dynamic piston seal configured to move the piston device when a predetermined pressure is reached; and a rupture disk adjacent the piston device, the rupture disk having a first pressure on a piston side and a second pressure on a second side, the rupture disk being configured to open when a predetermined pressure is exceeded.

12 Claims, 5 Drawing Sheets

Detail A

(56) References Cited

U.S. PATENT DOCUMENTS

| | | | |
|---|---|---|---|
| 6,736,012 B1 * | 5/2004 | Beall | E21B 41/0021 |
| | | | 73/709 |
| 7,395,866 B2 | 7/2008 | Milberger | |
| 8,201,486 B1 * | 6/2012 | Fuhrman | F41A 1/04 |
| | | | 89/7 |
| 8,960,222 B2 * | 2/2015 | Holbeche | F17C 13/04 |
| | | | 137/505.11 |
| 9,309,981 B2 * | 4/2016 | Porterfield | F16K 1/30 |
| 9,488,024 B2 | 11/2016 | Hoffman | |
| 9,568,117 B2 | 2/2017 | Adams | |
| 10,228,069 B2 * | 3/2019 | Wilson | B23K 15/0006 |
| 10,385,983 B2 * | 8/2019 | Ligeti | F16K 17/403 |
| 2010/0170573 A1 * | 7/2010 | Draper | B60K 6/12 |
| | | | 137/68.23 |
| 2017/0307095 A1 * | 10/2017 | Wilson | F16K 17/16 |
| 2017/0369310 A1 | 12/2017 | Wiedemeier | |

\* cited by examiner

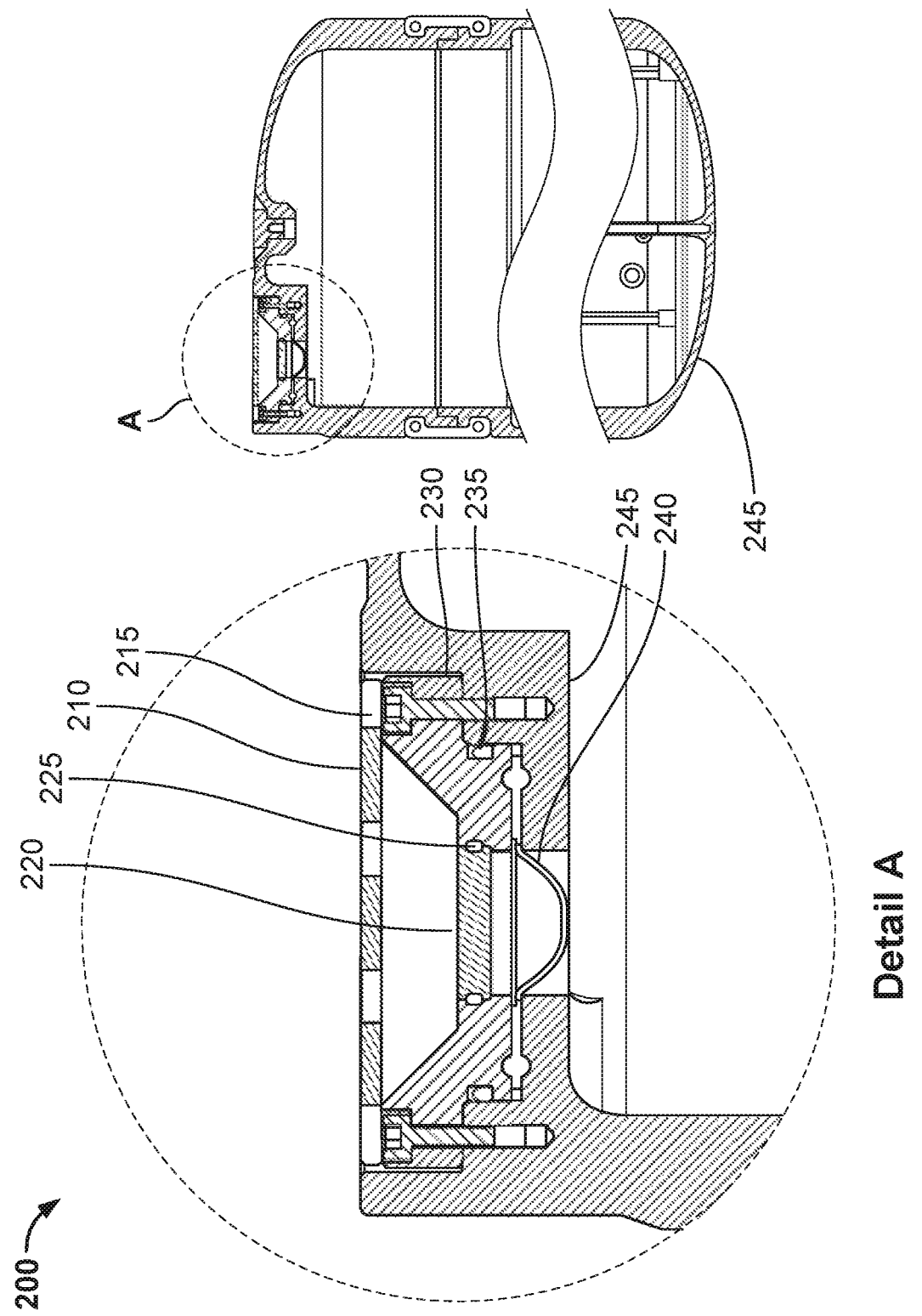

PRESSURE-COMPENSATED RUPTURE DISK ASSEMBLY FOR SUBSEA PROTECTION OF A PRESSURE VESSEL

FEDERALLY-SPONSORED RESEARCH AND DEVELOPMENT

The United States Government has ownership rights in this invention. Licensing inquiries may be directed to Office of Research and Technical Applications, Naval Information Warfare Center Pacific, Code 72120, San Diego, Calif., 92152; telephone (619)553-3001; email: ssc_pac_t2@navy.mil. Reference Navy Case No. 103,870.

BACKGROUND

The present disclosure relates generally to rupture disks and, more particularly, to a pressure-compensated rupture disk.

Some existing pressure vessels are pressure-compensated, such as those that actively create pressure. One example is where pressure vessels are used for hydrogen generation using hydride. For such pressure vessels, it may be desirable to relieve pressure at comparatively large volume flow rates in order to prevent pressure vessel overpressure due to blockage or exceedingly high gas generation.

Because certain exothermic reactions, such as with hydrides, increase their rates with temperature, thermal runaway can result in exceedingly high flow rates which would quickly (on the order of seconds) exceed pressure limits due to line backpressure. Additionally, line blockage due to reactants entering the exit line, relief valve failure or other blockages are a real possibility and would result in a similar failure.

It is desirable to prevent catastrophic failure of the pressure vessel, such as through a rupture disk which is sometimes also known as a burst disc, a pressure safety disk, or a burst diaphragm. Overpressure may occur when a hydride reaction exceeds safe flow limits and reactants enters the exit line. The resulting rupture from the rupture disk may save the vessel from damage.

However, using a rupture disk may prove challenging. Ambient factors such as density, corrosion, and fouling may render the rupture disk unpredictable for long term storage. In the case of deep operation, where a snorkel to the surface or where hoses carry the gas over long distances, a rupture disk that lacks pressure compensation would either rupture due to backpressure in the line, or rupture before the relief valve would open due to ambient pressure against that valve. Thus, a pressure-compensated disk is desirable.

There is a need for a rupture disk assembly with three key constraints. First, there is a need for a rupture disk assembly that provides protection of the rupture disk from corrosive environments or fouling. Second, there is a need for a rupture disk assembly that provides a predictable pressure to the back side of the rupture disk. Finally, there is a need for a rupture disk assembly that compensates for depth so that the vessel under normal operating parameters would not cause the disk to burst prematurely.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 2A illustrates another embodiment of a pressure-compensated rupture disk assembly for subsea protection of a pressure vessel in accordance with aspects of the present disclosure.

DETAILED DESCRIPTION OF SOME EMBODIMENTS

Aspects of the present disclosure provide a pressure-compensated rupture disk assembly that is capable of subsea operation, and that provides protection of the disk from corrosive environments or fouling. The present rupture disk assembly provides a fluid environment to the back side of the disk, and the rupture disk assembly compensates for depth so that a pressure vessel under normal operating parameters would not cause the rupture disk to burst prematurely.

Figure 1A:
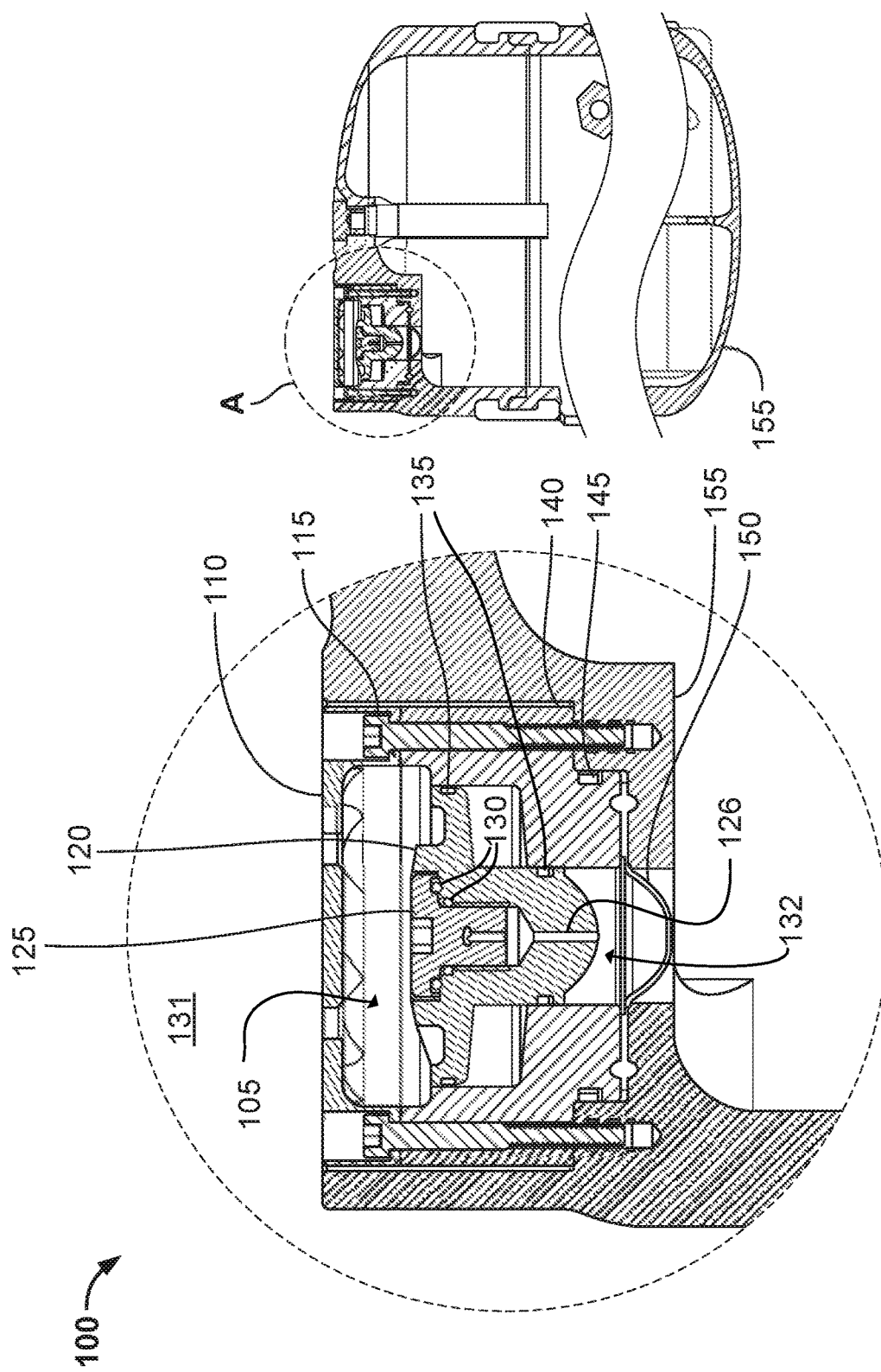
FIG. 1A illustrates a pressure-compensated rupture disk assembly for subsea protection of a pressure vessel in accordance with aspects of the present disclosure.

Referring now to FIG. 1A, illustrated is a pressure-compensated rupture disk assembly 100 for subsea protection of a pressure vessel in accordance with aspects of the present disclosure. Near the top of the illustration are a safety cover 110, clamp screws 115, and a piston device 120. The safety cover 110 captures the piston device 120 when a rupture occurs, thus preventing loss of portions of the pressure-compensated rupture disk assembly 100 to the surrounding environment. Safety cover 110 can be made to be removed at depth such that fouling will not completely plug the space 105 between the safety cover 110 and the piston device 120.

Piston device 120 is an active pressure compensating component that moves down, compressing a fluid (including a gas or a liquid) as the subsea depth of the rupture disk assembly piston device increases. The depth may be significant, e.g., as deep as any coastal waters.

Piston plug 125 is used to seal a communication channel 126 for a fluid on either side of the piston device 120 (i.e., between space 105 and compressible enclosure 132). Before the piston plug 125 is installed, the piston device 120 is able to move freely before setting at the desired height during assembly. Plug O-rings 130 may be used to prevent the piston plug 125 from leaking. Piston O-rings 135 may provide a dynamic seal that also allows motion of the piston device 120 relative to the compressible enclosure 132 which may house a fluid. A fluid injection could be employed for situations where greater depth is desired.

The dynamic seal provided by piston O-rings 135 offers protection of the rupture disk 150 from the external environment 131. Undersea survivability is difficult in many situations, made especially so with time as fouling, in combination with corrosion, can render inoperable a protective device such as a seal. Thus protection of the rupture disk assembly 100 is required to prevent premature failure or alternatively, inoperability. The rupture disk assembly 100 shown and described herein provides a means to seal the safety system away from the environment without compromising the operation of the rupture disk assembly 100. The piston device 120 is configured to be pushed up and out of the way by escaping fluid when an overpressure condition exists within the pressure vessel 155 and the rupture disk 150 bursts.

In the present embodiment, clamp 140 is a sanitary joint that may be a type that is typically used in rupture disks. However, clamp 140 may be any type of mechanism used to secure one object to another. Clamp screws 115 provide the clamping force that keeps both the safety cover 110 and the clamp 140 in place during operation.

Clamp O-Ring 145 prevents seawater from leaking past the clamp 140. Leaking may expose the rupture disk 150 edge to seawater and possible corrosion.

Rupture disk 150 is the safety valve that prevents overpressure of the pressure vessel 155. It is important to ensure there is enough margin in the pressure vessel 155 and connected components to allow for the delay in time and additional mechanical pressure to move the piston device 120 once the rupture disk 150 has been ruptured, this includes when the rupture disk 150 is fouled. In order to preserve the contents of the pressure vessel from loss, safety cover 110 is adapted to secure the piston device 120 to pressure vessel 155.

Pressure vessel 155 may include an enclosure or contiguous volume such as compressible enclosure 132 that is capable of receiving a fluid. The compressible enclosure 132 may be used for a fluid-creating reaction. It should be noted that using a liquid as opposed to a gas may greatly reduce the space required for movement of piston device 120. Partial reaction of the fluid generating pressure vessel 155 could allow the pressure vessel 155 to compensate for depth.

Though the present rupture disk assembly 100 was developed for a fluid producing reaction chamber, it can be used in any system or pressure vessel 155 that could generate large volumes of fluid, or with any equipment that is subject to overpressure while underwater.

The piston device 120 is ideally placed at an initial height that allows sufficient movement of the piston device 120 until a particular underwater depth (also called a design depth) is reached. By way of non-limiting example, the geometry of the piston device 120 may have roughly a ten-to-one (10:1) ratio from what is shown in FIG. 1 to fully compressed, thus allowing a ten atmosphere (10 ATM) differential from surface to depth. The piston device 120 can be designed for any design depth. The piston device 120 doesn't have to match the geometry shown, and this geometry is merely an example.

As depth increases, the piston device 120 will move down toward the rupture disk 150, thereby equalizing the pressure on either side of the piston device 120. Pre-charging the working fluid could prevent backpressure on the rupture disk assembly 100 at depth. Increasing the depth further will not gain any additional pressure compensation. Additionally, if the rupture disk assembly 100 was brought back to the surface, the piston device 120 would again move upward to compensate to the new ambient pressure.

In lieu of rupture disk 150, a resettable poppet valve or relief valve could be used in place of the rupture disk 150 if the fluid volume is not expected to be excessively large.

When pressures inside the pressure vessel 155 exceed a predetermined pressure, e.g., the differential rating of the rupture disk 150, the rupture disk 150 will rupture, thereby preventing damage to the pressure vessel 155 itself.

Figure 1B:
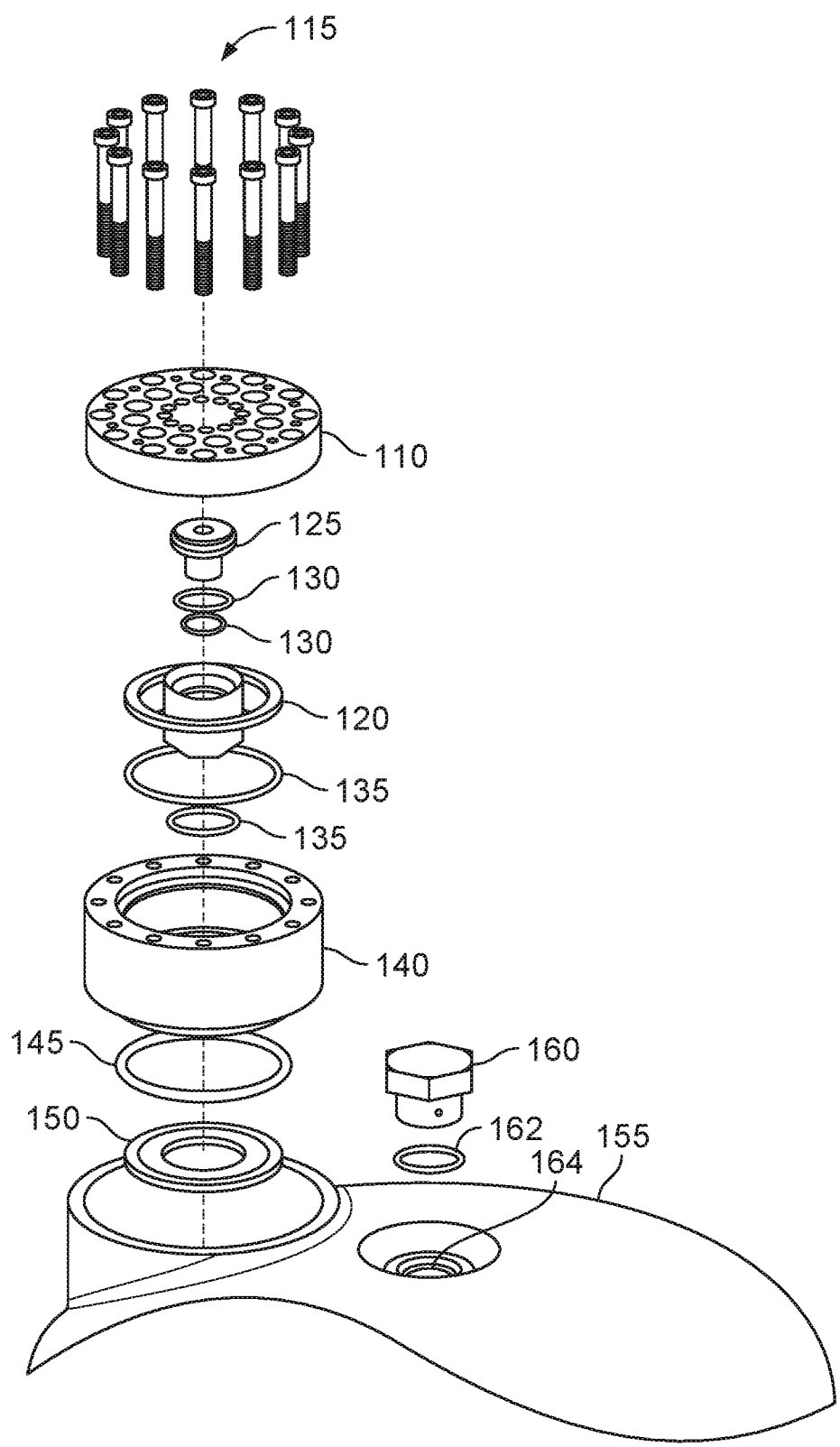
FIG. 1B illustrates the pressure-compensated rupture disk assembly of FIG. 1A in accordance with aspects of the present disclosure.

FIG. 1B is an exploded view of a pressure-compensated rupture disk assembly for subsea protection of a pressure vessel in accordance with aspects of the present disclosure.

As shown in FIG. 1B, clamp screws 115 may be inserted into safety cover 110 and clamp 140. Secured therebetween, in order, may be a piston plug 125 and plug O-rings 130 which may be seated in the middle opening of piston device 120. Piston O-rings 135 may sit below piston device 120 in order to seal piston device 120 and allow motion of the piston device.

Clamp 140 may include clamp O-ring 145 which may seal clamp 140 to prevent leakage. Rupture disk 150 may sit below clamp 140. Rupture disk 150 may be situated just above pressure vessel 155. Fluid injection may be accomplished via port plug 160, port plug seal 162 and port 164. Fluid may be injected into port 164. Thereafter, port 164 may be sealed by inserting port plug 160 with port plug seal 162 sealedly attached thereto.

Figure 2B:
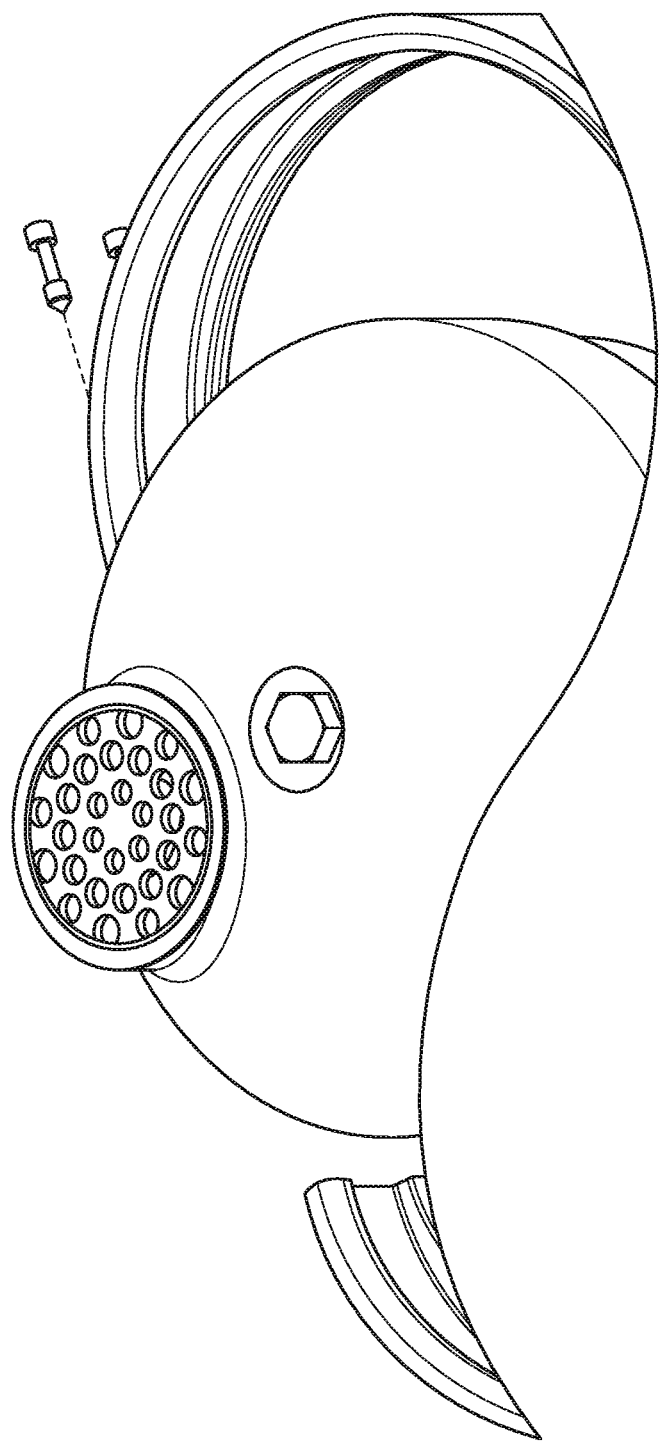
FIG. 2B illustrates the pressure-compensated rupture disk assembly of FIG. 2A in accordance with aspects of the present disclosure.

Referring now to FIG. 2A, illustrated is another embodiment of a pressure-compensated rupture disk assembly 200 for subsea protection of a pressure vessel in accordance with aspects of the present disclosure. In this embodiment, the rupture disk assembly 200 includes safety cover 210, which may capture elements of the rupture disk assembly 200 in case of overpressure and prevents loss.

Piston device 220 is generally stationary in this embodiment. In lieu of piston device 220, a protective cap which does not compensate could be used as the piston device 220 for shallow water applications. Piston O-rings 225 provide a dynamic seal for piston device 220. Clamp 230 is a sanitary joint typically used in rupture disks. Clamp 230 may require a specific type of clamp design to mimic a sanitary joint. Clamp screws 215 provide the clamping force that keeps the safety cover 210 and the clamp 230 in place during operation. Clamp O-rings 235 provide redundant protection that prevents the clamp 230 from leaking, which may expose the rupture disk assembly 100 to seawater and possible corrosion.

Although piston O-rings 225 are generally stationary, they allow motion of the piston device 220 when the rupture disk 240 is ruptured. Piston device 220 does not compensate, however, it still provides the protection and fluid atmosphere to allow operation of the rupture disk 240.

Clamp 230 is the sanitary joint typically used in rupture disks. Clamp 230 requires a specific type of clamp design to mimic a sanitary joint.

Clamp O-ring 235 prevents the clamp from leaking, thus exposing the rupture disk edge to seawater and possible corrosion.

Rupture disk 240 is the safety valve that prevents overpressure of the pressure vessel 245. Pressure vessel 245 is where the gas creating reaction may take place.

For shallow depths, the piston device 220 prevents corrosion and fouling of the rupture disk 240 as well as providing a gaseous atmosphere for the rupture disk 240 to rupture normally. As depth increases, the piston device 220 will not move. Additionally, if the rupture disk assembly 200 was brought back to the surface, the piston device 220 would stay in place. Piston device 220 could also take other forms. It could be a cap over the end of a pipe which is attached to a pressure vessel 245. Instead of having a piston device 220, a pipe could be added to pressure vessel 245 and piston device 220 could be on the outside of pressure vessel 245. When pressures inside the rupture disk 240 exceed a predetermined pressure, which may be the differential rating or burst pressure of the rupture disk 240, the rupture disk 240 will rupture, thereby preventing damage to the pressure vessel 245 itself. The predetermined pressure may be based on a differential pressure between the first side and the second side of the rupture disk 240.

The rupture disk 240 may be used as a means to protect a contiguous volume from overpressure.

Protecting the rupture disk 240 from fouling and corrosion will allow rupture disk 240 to behave as intended. Pressure compensation on the front side of rupture disk 240 will prevent reverse bursting of the rupture disk 240 for deep subsea operation. The pressure compensation on the back side of piston device 220 does not necessarily have to result from movement of piston device 220 and can be fluid compensated.

The rupture disk assembly and method described herein provide protection from a corrosive and fouling environment. The present rupture disk assembly and method also provide a compressible enclosure for fluid, as well as pressure compensation.

Figure 3:
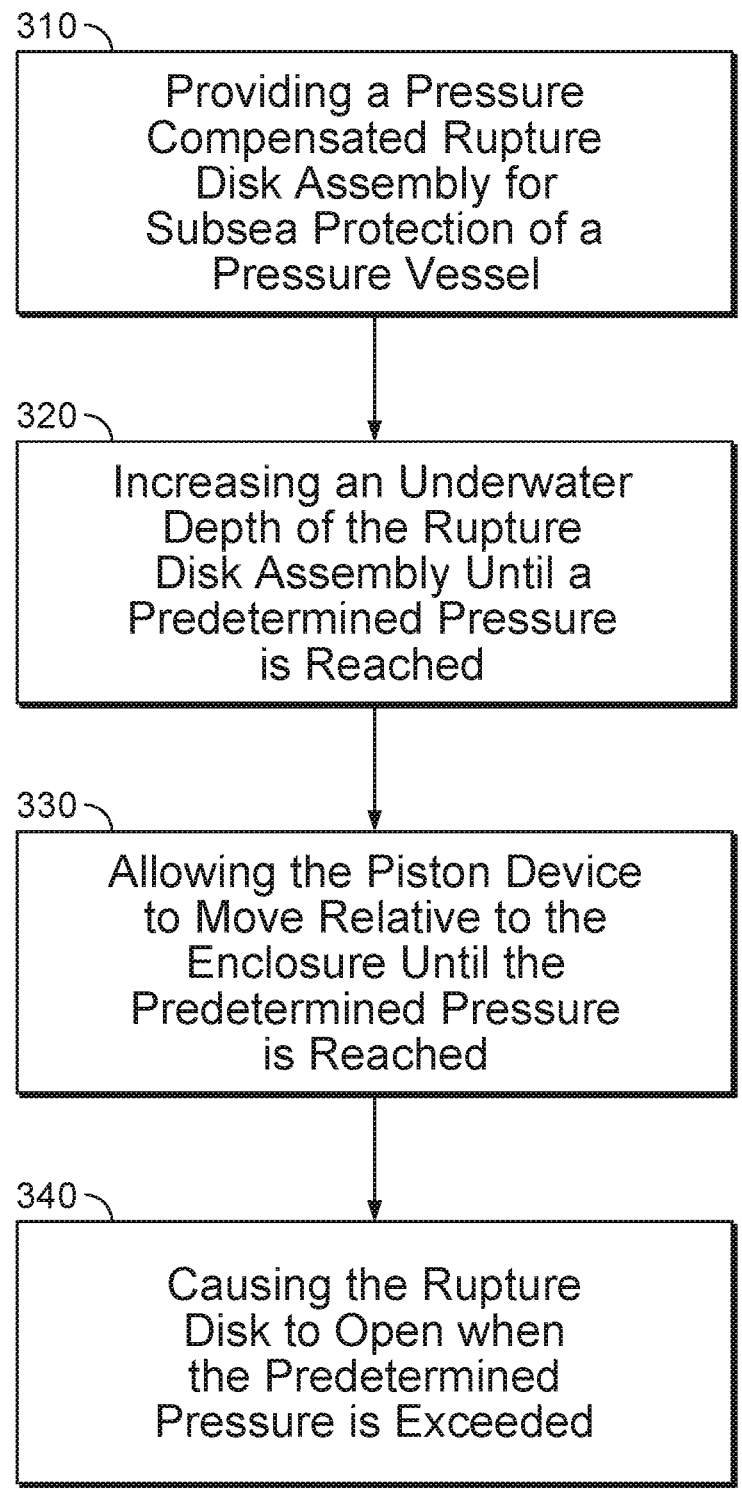
FIG. 3 illustrates a flow chart for a method for deploying a pressure-compensated rupture disk assembly in accordance with aspects of the present disclosure.

FIG. 3 illustrates a flow chart for a method for deploying a pressure-compensated rupture disk assembly in accordance with aspects of the present disclosure. At step 310, the method includes providing a pressure-compensated rupture disk assembly having a compressible enclosure having a gas or liquid, or other fluid, disposed therein. The rupture disk assembly also has a piston device configured to move relative to the compressible enclosure until a predetermined pressure is reached, and a dynamic piston seal configured to seal the compressible enclosure and allow motion of the piston device relative to the compressible enclosure. The rupture disk assembly also has a rupture disk configured to open when a predetermined pressure is exceeded; and a piston plug operatively coupled to the piston device. The piston plug is configured to open a communication channel for the gas or liquid on either side of the piston device to allow the piston to move until the predetermined pressure is reached.

At step 320, the method includes increasing an underwater depth of the rupture disk assembly until a predetermined pressure is reached. At step 330, the method includes allowing the piston device to move relative to the enclosure until the predetermined pressure is reached. As depth increases, the piston may move down toward the disk, thereby equalizing pressure on either side of the piston. When the piston traverses its intended height or path, the maximum design depth may be reached. At step 340, when the pressures inside the pressure vessel exceed a predetermined pressure, the rupture disk will rupture. The predetermined pressure at which the rupture disk ruptures may be the differential rating of the rupture disk. This rupture prevents damage to the vessel itself.

The rupture disk assembly may be tolerant to backpressure and may perform within an acceptable margin despite the backpressure, i.e., the disk burst rating was increased to the normal differential pressure plus the back side ambient pressure, and held a backpressure for some time before testing without leakage or apparent physical damage. However, a double compensated system can be employed such that the standard differential operation of the rupture disk can be utilized.

The foregoing description of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A rupture disk assembly for subsea protection of a pressure vessel, comprising:
    a piston device having a first end that is configured to be exposed to ambient seawater and a second end that forms a first wall of a compressible enclosure that is filled with fluid;
    a rupture disk forming a second wall of the compressible enclosure, the rupture disk being configured to burst when a predetermined pressure within the pressure vessel is exceeded;
    a piston seal configured to prevent leakage of the ambient seawater into the compressible enclosure while the rupture disk is intact and to allow movement of the piston device away from the rupture disk when the rupture disk bursts, wherein the piston seal is a dynamic seal allowing the piston device to move such that pressure within the compressible enclosure changes in response to changes in ambient pressure; and
    a piston plug operatively coupled to the piston device, wherein the piston device further comprises a fluid communication channel between the first end and the second end and wherein the piston plug is configured to seal the fluid communication channel.

2. The rupture disk assembly of claim 1,
    wherein the piston is configured to move toward the rupture disk a predetermined distance as ambient pressure increases up to a particular ambient pressure above which further movement of the piston is stopped.

3. The rupture disk assembly of claim 2, wherein the piston's movement toward the rupture disk is stopped before the piston's second end comes in contact with the rupture disk.

4. The rupture disk assembly of claim 1, wherein the fluid is a gas.

5. A pressure-compensated rupture disk assembly for subsea protection of a pressure vessel, comprising:
    a rupture disk having a first side configured to be in fluid communication with interior fluid within the pressure vessel and having a second side that forms a first wall of a gas-filled, compressible enclosure, the rupture disk being configured to burst when a predetermined pressure within the pressure vessel is exceeded;
    a piston having a first end that is configured to be exposed to ambient seawater and a second end that forms a second wall of the compressible enclosure, wherein the piston is configured to move toward the rupture disk a predetermined distance as ambient pressure increases up to a particular ambient pressure above which further movement of the piston is stopped such that the piston's second end does not come in contact with the rupture disk wherein the piston comprises a fluid communication channel between the first and second ends;
    a dynamic piston seal configured to prevent leakage of the ambient seawater into the compressible enclosure when the rupture disk is intact and to allow movement of the piston away from the rupture disk when the rupture disk bursts, wherein the dynamic piston seal is also configured to allow movement of the piston toward the rupture disk such that gas pressure within the compressible enclosure changes in response to changes in ambient pressure; and a removable piston plug configured to seal the fluid communication channel to prevent fluid transfer through the fluid communication channel.

6. The pressure-compensated rupture disk assembly of claim 5, further comprising a perforated safety cap configured so as to allow ambient seawater communication with the piston's first end and to secure the piston to the pressure vessel after failure of the rupture disk.

7. The pressure-compensated rupture disk assembly of claim 6, wherein the pressure vessel generates interior fluid to compensate for increasing ambient seawater pressure.

8. The pressure-compensated rupture disk assembly of claim 7, wherein the compressible enclosure has a ten-to-one (10:1) ratio from an uncompressed configuration to a piston-stopped configuration, thereby allowing a ten atmosphere (10 ATM) pressure differential between pressures at a sea surface and a design depth.

9. A method for providing subsea protection of a pressure vessel using a rupture disk assembly, comprising:
  mounting a rupture disk on the pressure vessel such that a first side of the rupture disk is in fluid communication with interior fluid within the pressure vessel and such that a second side of the rupture disk forms a first wall of a compressible fluid enclosure;
  positioning a piston on the pressure vessel at a predetermined distance from the rupture disk with a dynamic seal such that a first end of the piston is configured to be exposed to ambient seawater and a second end of the piston forms a second wall of the compressible fluid enclosure and such that the dynamic seal prevents leakage of the ambient seawater into the compressible fluid enclosure when the rupture disk is intact and allows movement of the piston away from the rupture disk and leakage of ambient seawater into the compressible fluid enclosure when the rupture disk bursts, wherein the dynamic seal is also configured to allow movement of the piston toward the rupture disk such that fluid pressure within the compressible fluid enclosure changes in response to changes in ambient pressure;
  mounting a removable piston plug on the piston so as to seal a fluid communication channel between the first and second ends such that fluid transfer through the fluid communication channel is prevented; and
  mounting a perforated safety cap to the pressure vessel so as to allow ambient seawater communication with the piston's first end and to secure the piston to the pressure vessel in the event of rupture disk failure.

10. The method of claim 9, further comprising the step of lowering the pressure vessel into the sea to a design depth.

11. The method of claim 10, further comprising the step of generating interior fluid within the pressure vessel as the pressure vessel descends to compensate for increasing ambient seawater pressure.

12. The method of claim 11, wherein the ambient seawater at the design depth has a pressure that is ten times a pressure at a sea surface.

* * * * *